United States Patent [19]
Hotta et al.

[11] Patent Number: 5,589,964
[45] Date of Patent: Dec. 31, 1996

[54] FERROELECTRIC LIQUID CRYSTAL DEVICE WITH MINUTE CONVEXITIES BETWEEN ADJACENT ELECTRODES

[75] Inventors: Yoshio Hotta; Yukio Hanyu, both of Atsugi; Tadashi Mihara, Isehara; Yasuto Kodera, Fujisawa; Katsutoshi Nakamura, Atsugi, all of Japan

[73] Assignee: Canon Kabushiki Kaisha, Tokyo, Japan

[21] Appl. No.: 431,564

[22] Filed: Apr. 27, 1995

Related U.S. Application Data

[62] Division of Ser. No. 8,607, Jan. 22, 1993, Pat. No. 5,467,209.

[30] Foreign Application Priority Data

Jan. 24, 1992 [JP] Japan .................. 4-011025
Jan. 24, 1992 [JP] Japan .................. 4-032861

[51] Int. Cl.$^6$ ............... G02F 1/141; G02F 1/1333
[52] U.S. Cl. ............... 349/160; 349/143; 349/172
[58] Field of Search ............... 359/75, 76, 78, 359/82, 100, 54, 87

[56] References Cited

U.S. PATENT DOCUMENTS

| | | | |
|---|---|---|---|
| 4,367,924 | 1/1983 | Clark et al. | 350/334 |
| 4,561,726 | 12/1985 | Goodby et al. | 350/341 |
| 4,712,875 | 12/1987 | Tsuboyama et al. | 350/344 |
| 4,712,877 | 12/1987 | Okada et al. | 350/350 S |
| 4,728,176 | 3/1988 | Tsuboyama et al. | 350/350 S |
| 4,740,060 | 4/1988 | Komura et al. | 350/344 |
| 4,775,225 | 10/1988 | Tsuboyama et al. | 350/344 |
| 5,007,716 | 4/1991 | Hanyu et al. | 350/336 |
| 5,013,137 | 5/1991 | Tsuboyama et al. | 350/333 |
| 5,054,890 | 10/1991 | Hanyu et al. | 350/344 |
| 5,099,344 | 3/1992 | Tsuboyama et al. | 359/79 |
| 5,103,331 | 4/1992 | Taniguchi et al. | 359/81 |
| 5,109,294 | 4/1992 | Hanyu et al. | 359/78 |
| 5,132,816 | 7/1992 | Itoh et al. | 359/67 |
| 5,138,473 | 8/1992 | Dijon et al. | 359/67 |
| 5,165,076 | 11/1992 | Tsboyama et al. | 359/75 |
| 5,189,536 | 2/1993 | Hanyu et al. | 359/56 |
| 5,204,766 | 4/1993 | Taniguchi et al. | 359/81 |
| 5,270,844 | 12/1993 | Maruyama et al. | 359/79 |
| 5,285,300 | 2/1994 | Suzuki et al. | 359/87 |
| 5,285,304 | 2/1994 | Hotta et al. | 359/81 |
| 5,381,255 | 1/1995 | Ohnuma et al. | 359/81 |
| 5,381,256 | 1/1995 | Hanyu et al. | 359/79 |
| 5,452,114 | 9/1995 | Hotta et al. | 359/75 |

FOREIGN PATENT DOCUMENTS

| | | | |
|---|---|---|---|
| 0164725 | 8/1985 | Japan | 359/67 |
| 3-170913 | 7/1991 | Japan | 359/82 |

*Primary Examiner*—William L. Sikes
*Assistant Examiner*—Tai V. Duong
*Attorney, Agent, or Firm*—Fitzpatrick, Cella, Harper & Scinto

[57] ABSTRACT

A ferroelectric liquid crystal device is constituted by a pair of substrates each having thereon a group of display electrodes, and a ferroelectric liquid crystal disposed between the substrates. Liquid crystal movement causing yellowing or local increase in liquid crystal layer thickness is minimized in the device by forming a substantial in liquid crystal layer thickness between a pixel part and a non-pixel part and/or by forming a groove having minute convexities with a maximum diameter of at least 0.1 μm at non-pixel parts on a substrate so that the groove extends in a direction forming an angle of 45–135 degrees with a normal to smectic layers of the liquid crystal.

8 Claims, 9 Drawing Sheets

$D \geqq d + d/2$ $D \leqq d - d/2$

1

FERROELECTRIC LIQUID CRYSTAL DEVICE WITH MINUTE CONVEXITIES BETWEEN ADJACENT ELECTRODES

This application is a division of application Ser. No. 08/008,607, filed Jan. 22, 1993 now U.S. Pat. No. 5,467,209.

FIELD OF THE INVENTION AND RELATED ART

The present invention relates to a liquid crystal device using a ferroelectric liquid crystal.

A display device of the type which controls transmission of light in combination with a polarizing device by utilizing the refractive index anisotropy of ferroelectric liquid crystal molecules has been proposed by Clark and Lagerwall (U.S. Pat. No. 4,367,924, etc.). The ferroelectric liquid crystal has generally chiral smectic C phase (SmC*) of H phase (SmH*) of a non-helical structure and, under this state, shows a property of taking either one of a first optically stable state and a second optically stable state responding to an electrical field applied thereto and maintaining such a state in the absence of an electrical field, namely bistability, and also has a rapid response to the change in electrical field. Thus, it is expected to be utilized in a high speed and memory type display device and particularly to provide a large-area, high-resolution display.

For an optical modulating device by use of a liquid crystal having such bistability to exhibit desirable driving characteristics, it is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation:

$$I/I_0 = \sin^2 4\theta \sin^2(\Delta n d/\lambda)\pi,$$

wherein $I_0$: incident light intensity,
I: transmitted light intensity,
θ: tilt angle,
Δn: refractive index anisotropy,
d: thickness of the liquid crystal layer,
λ: wavelength of the incident light.

The tilt angle θ in the above-mentioned non-helical structure is recognized as a half of an angle between the average molecular axis directions of liquid crystal molecules in a twisted alignment in a first orientation state and a second orientation state. According to the above equation, it is shown that a tilt angle θ of 22.5 degrees provides a maximum transmittance and the tilt angle in a non-helical structure for realizing bistability should desirably be as close as possible to 22.5 degrees.

A method for aligning a ferroelectric liquid crystal should desirably be such that molecular layers each composed of a plurality of molecules of a smectic liquid crystal are aligned uniaxially along their normals, and it is desirable to accomplish such an alignment state by a rubbing treatment which requires only a simple production step. As an alignment method for a ferroelectric liquid crystal, particularly a chiral smectic liquid crystal in a non-helical structure, one disclosed in U.S. Pat. No. 4,561,726 has been known for example.

However, there has been found a problem that, when such a ferroelectric liquid crystal device of a cell structure is continually driven for a long time, the thickness along a cell side is gradually increased to show a pale yellow tint.

SUMMARY OF THE INVENTION

An object of the present invention is to provide a ferroelectric liquid crystal device which does not substantially cause a cell thickness increase along a cell side leading to yellowing of the cell even after continual drive for a long time.

According to the present invention, there is provided a ferroelectric liquid crystal device, comprising: a pair of substrates each having thereon a group of display electrodes, and a ferroelectric liquid crystal disposed between the substrates, wherein a difference in liquid crystal layer thickness is formed between a part sandwiched by an opposite pair of display electrodes and a part sandwiched by a display electrode on one substrate and a part between neighboring display electrodes on the other substrate, and the difference is at least ½ of the liquid crystal layer thickness at the part sandwiched by the opposite pair of display electrodes.

According to another aspect of the present invention, there is provided a ferroelectric liquid crystal device, comprising: a pair of substrates each having thereon a group of electrodes, and a ferroelectric liquid crystal disposed between the substrates, wherein a groove having minute convexities with a maximum diameter of at least 0.1 μm is formed between neighboring electrodes on a substrate, and the neighboring electrodes extend in a direction which forms an angle of 45–135 degrees with a normal to smectic layers of the liquid crystal.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

There will be described a reason why the above-mentioned yellowing, i.e., the phenomenon of yellowing on a side of a display cell along with a cell thickness increase on the cell side, is caused when a liquid crystal cell is continually driven for a long time.

The above-mentioned yellowing phenomenon is liable to occur in a ferroelectric liquid crystal cell wherein a uniform alignment state as represented by relationships of $(H)<\alpha+\delta$ and $(H)>\theta a>(H)/2$ is developed, wherein $(H)$ denotes a cone angle, $\alpha$ denotes a pretilt angle, $\delta$ denotes a layer inclination angle, and $\theta a$ denotes an apparent tilt angle, respectively, of the ferroelectric liquid crystal.

More specifically, according to our experiments when a conventional ferroelectric liquid crystal cell including a ferroelectric liquid crystal of a non-helical structure in a high pretilt alignment state formed by a rubbed polyimide film is continually driven to write a fixed pattern of a white or black state, the liquid crystal molecules are moved in a direction perpendicular to the rubbing direction, i.e., in a direction of extension of liquid crystal molecular layers in chiral smectic C phase, whereby liquid crystal molecules are accumulated in the destination side to form a region with an increased cell thickness and colored in light yellow. On the opposite side, however, liquid crystal molecules are lacked to form a void. These phenomena are caused most noticeably in the neighborhood of the sealing part of the cell and gradually propagated toward the inside of the cell.

Figure 2A:
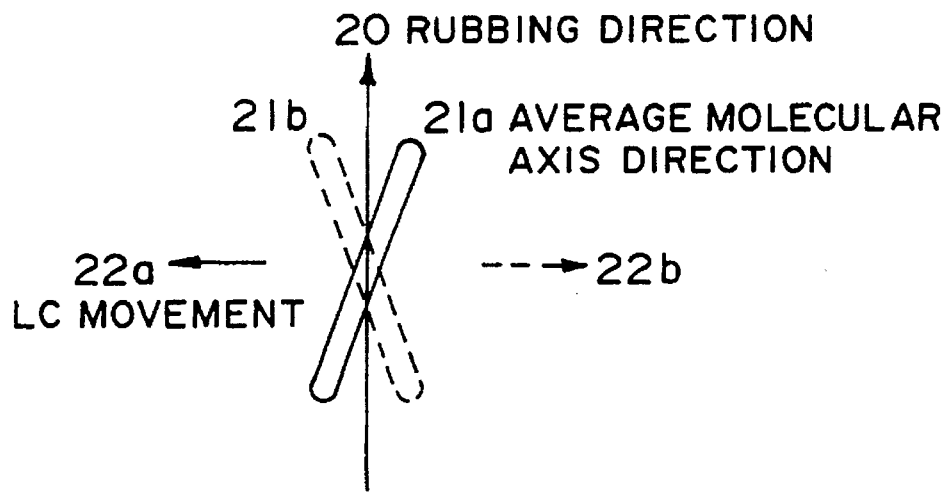
FIGS. 2A and 2B are explanatory views for illustrating a cell thickness increase along a cell side in relation with a liquid crystal movement in directions of smectic layer extension.
Figure 2B:
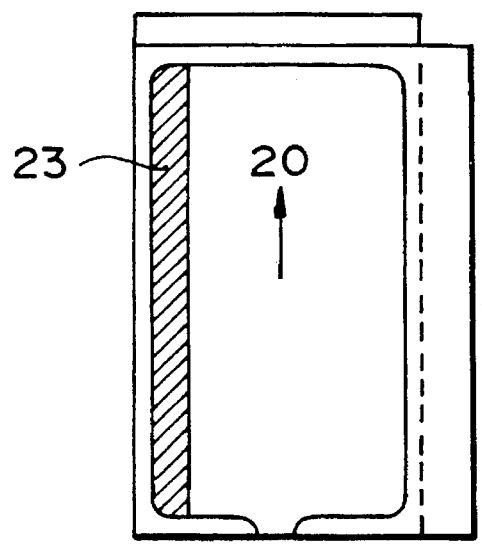

Further, according to our study, the increase in cell thickness at the cell side is recognized to be caused by a pressure increase which in turn is caused by movement of liquid crystal molecules in a particular direction due to driving. Presumably, such a force causing the liquid crystal molecule movement may be attributable to an electrodynamic effect caused by perturbation of liquid crystal molecule dipole moments in an AC-like electric field caused by continuation of drive pulses. Further, according to our experiments, the directions 22a and 22b of the liquid crystal movement are determined in relation with the rubbing direction 20 and the average liquid crystal molecular axis position 21a or 21b as shown in FIG. 2A. As the moving direction of liquid crystal molecules is related with the rubbing direction, the above-mentioned phenomenon is assumed to depend on the pre-tilt state at the substrate surfaces. Referring to FIGS. 2A and 2B, reference numeral 21a (or 21b in a reverse orientation state) denotes an average molecular axis (director) orientation. When the liquid crystal molecules (described herein as having a negative spontaneous polarization) are oriented to provide the average molecular axis 21a and are supplied with a certain strength of AC electric field not causing a switching to the orientation state 21b, the liquid crystal molecules are liable to move in the direction of an arrow 22a in the case where the substrates are provided with rubbing axes extending in parallel and in the same direction 20. This liquid crystal movement phenomenon depends on an alignment state in the cell. More specifically, this phenomenon hardly occurs in C2 alignment but is remarkably observed in C1 alignment and uniform alignment described hereinafter.

Figure 3:
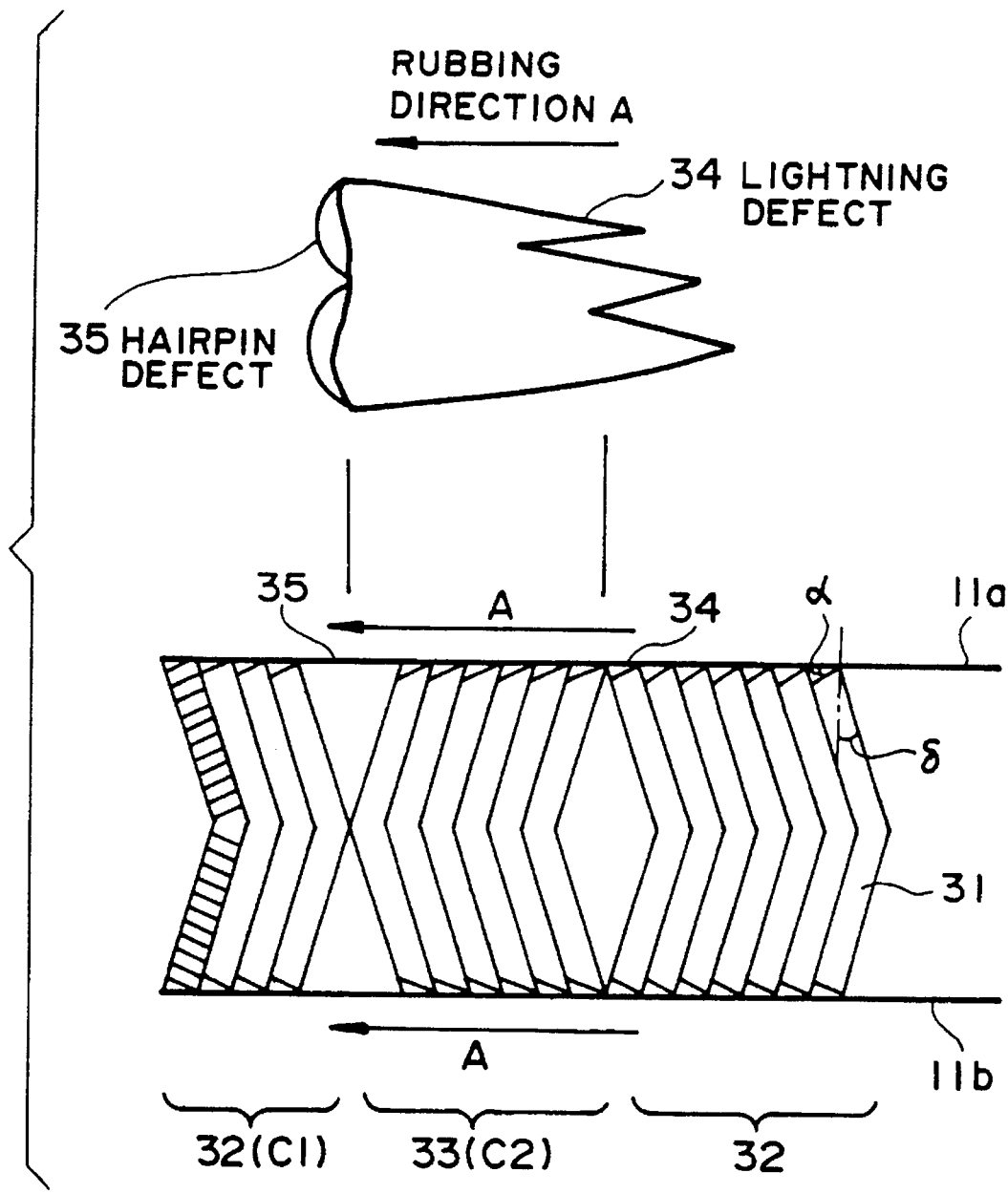
FIG. 3 is an explanatory view for illustrating an alignment state occurring in a chiral smectic liquid crystal used in the invention.

The two alignment states C1 and C2 may be explained by a difference in chevron structure of smectic layers as shown in FIG. 3. Referring to FIG. 3, reference numeral 31 denotes a smectic layer showing ferroelectricity, 32 denotes a C1 alignment region, and 33 denotes a C2 alignment region. A smectic liquid crystal generally has a layer structure and causes a shrinkage of layer pitch when it is transformed from SmA (smectic A) phase into SmC (smectic C) phase or SmC* (chiral smectic C) phase, to result in a structure accompanied with a bending of layers between the upper and lower substrates 14a and 14b (chevron structure) as shown in FIG. 3. The bending of the layers 31 can be caused in two ways corresponding to the C1 and C2 alignment as shown. As is well known, liquid crystal molecules at the substrate surfaces are aligned to form a certain angle a (pre-tilt) as a result of rubbing in a direction A in such a manner that their heads (leading ends) in the rubbing direction are up (or away) from the substrate surfaces 11a and 11b. Because of the pretilt, the C1 and C2 alignment states are not equivalent to each other with respect to their elastic energy, and a transition between these states can be caused at a certain temperature or when supplied with a mechanical stress. When the layer structure shown in FIG. 3 is viewed in plan as shown in the upper part of FIG. 3, a boundary 34 of transition from C1 alignment (32) to C2 alignment (33) in the rubbing direction A looks like a zigzag lightning and is called a lightning defect, and a boundary 35 of transition from C2 alignment (33) to C1 alignment (32) forms a broad and moderate curve and is called a hairpin defect.

When FLC is disposed between a pair of substrates 14a and 14b and placed in an alignment state satisfying a relationship of $(H)<\alpha+\delta$ ... (1), wherein $\alpha$ denotes a pretilt angle of the FLC, $(H)$ denotes a tilt angle (a half of cone angle), and $\delta$ denotes an angle of inclination of SmC* layer, there are four states each having a chevron structure in the C1 alignment state. These four C1 alignment states are different from the known C1 alignment state. Further, two among the four C1 alignment states form bistable states (uniform alignment). Herein, two states among the four C1 states giving an apparent tilt angle $\theta_a$ therebetween in the absence of an electric field satisfying a relationship of $(H)>\theta_a>(H)/2$ ... (2) are inclusively referred to as a uniform state.

Figure 4B:
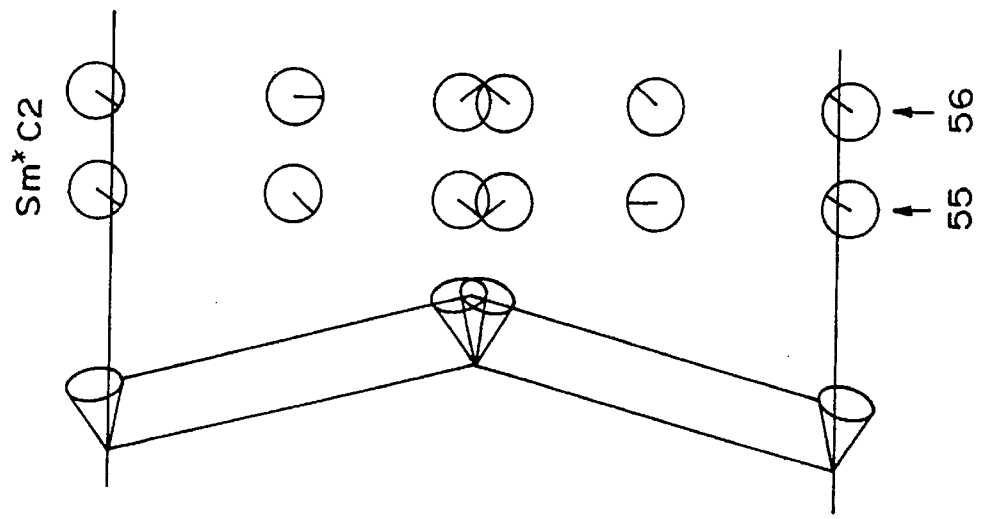
FIGS. 4A and 4B are explanatory views for illustrating changes in director orientation according to various positions between substrates in C1 alignment and C2 alignment, respectively.
Figure 4A:
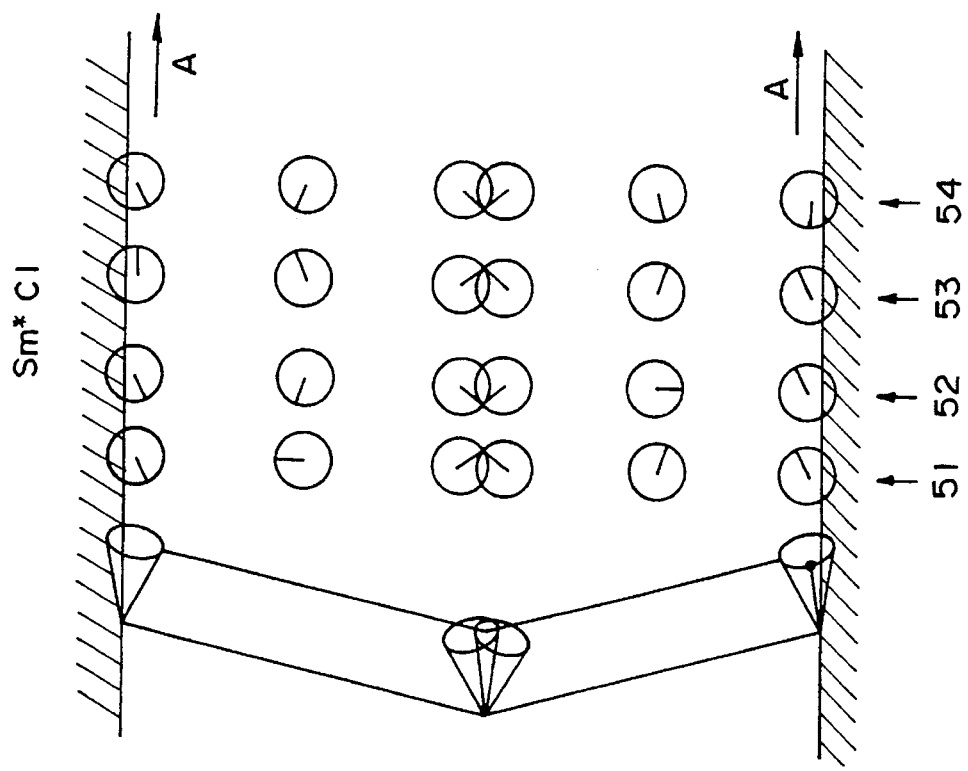

In the uniform state, the directors are believed to be not twisted between the substrates in view of optical properties thereof. FIG. 4A is a schematic view illustrating director positions between the substrates in the respective states in C1 alignment. More specifically, at 51–54 are respectively shown changes in director positions between the substrates in the form of projections of directors onto cone bottoms as viewed from each bottom. At 51 and 52 is shown a splay state, and at 53 and 54 is shown a director arrangement which is believed to represent a uniform alignment state. As is understood from FIG. 4A, at 53 and 54 representing a uniform state, the molecule position (director) is different from that in the splay state either at the upper substrate or lower substrate. FIG. 4B shows two states in C2 alignment between which no switching is observed at the boundaries but an internal switching is observed. The uniform state in C1 alignment provides a larger tilt angle $\theta_a$ and thus a higher brightness and a higher contrast than the conventionally used bistable state in C2 alignment.

However, in a ferroelectric liquid crystal having a uniform alignment state based on the condition of $(H)>\theta a>(H)/2$, the above-mentioned problem of the yellowing due to the liquid crystal movement is liable to occur.

In an actual liquid crystal cell, the liquid crystal movement occurs as shown in FIG. 2A. For example, when the liquid crystal molecules in the entire cell are placed in a state providing an average molecular axis direction 21a, the liquid crystal molecules in the cell are liable to move under AC application in the direction of the arrow 22, i.e., from the right to the left in the figure. As a result, the cell thickness in a region 23 is increased gradually to show a yellowish tint. If the liquid crystal molecules are placed in a state providing an average molecular axis 21b, the liquid crystal movement under AC application is caused in the reverse direction 22b. In either case, the liquid crystal movement is caused in a direction perpendicular to the rubbing direction, i.e., in the direction of extension of smectic layers.

Figures 1A, 1B:
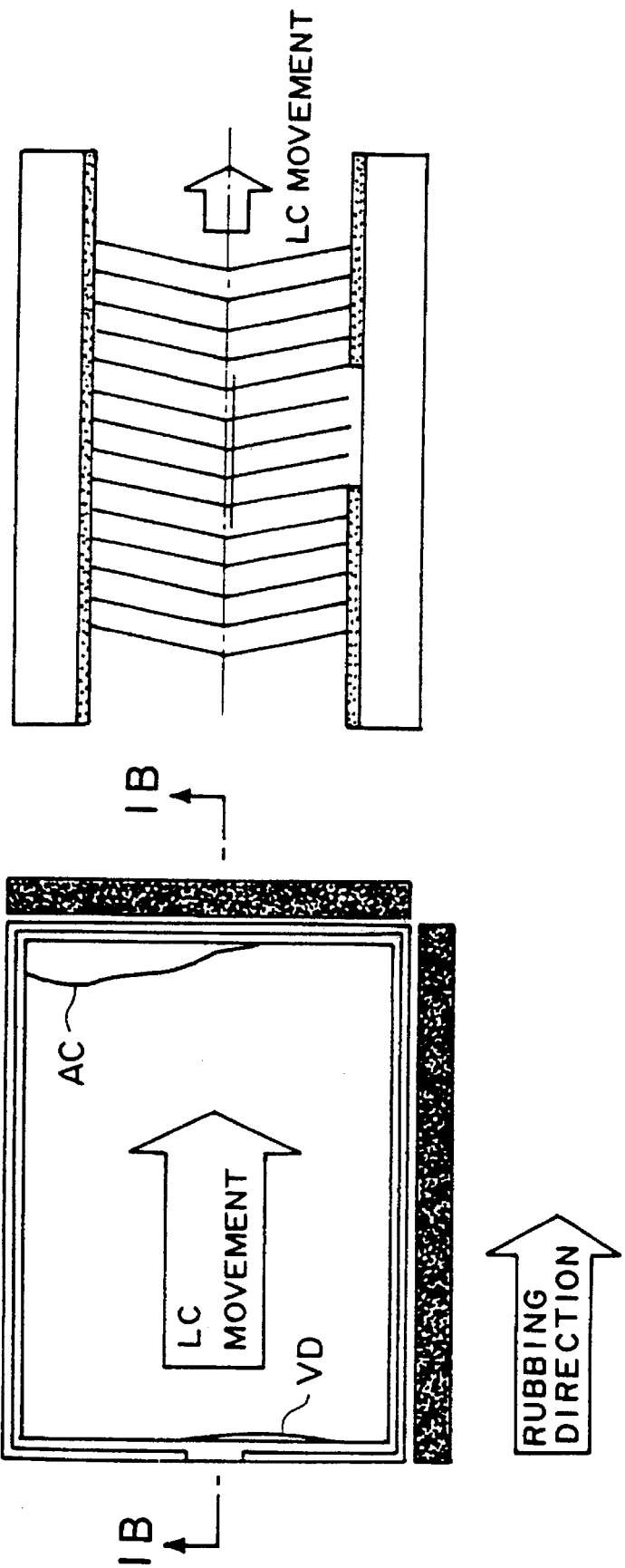
FIGS. 1A and 1B are a plan view and a schematic sectional view, respectively, for illustrating a liquid crystal movement in a direction normal to smectic layers.

We have also found a cell thickness increase in the directon of normal to the smectic layers as shown in FIG. 1A (plan view) and 1B (sectional view taken along the line 1—1 in FIG. 1A) in addition to the one caused in the direction of the smectic layers explained With reference to FIGS. 2A and 2B. We have also recognized that the cell thickness increase caused in the direction of the smectic layer normal is an irreversible phenomenon. Accordingly, if a cycle including continual application of AC voltage to a cell and standing of the cell without voltage application for some time, liquid crystal molecules are gradually accumulated in the destination side in the smectic layer normal direction for form a region AC with an increased cell thickness and colored in light yellow as shown in FIG. 1A. On the opposite side, however, liquid crystal molecules are lacked to form a void VD as shown in FIG. 1A.

Figure 10:
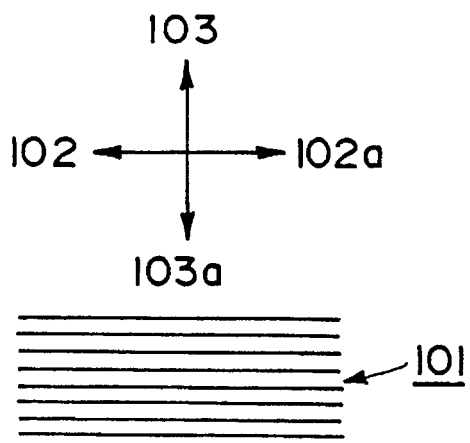
FIG. 10 is an illustration of a layer direction of smectic layers and a normal direction.

In summary, according to our experiments, the liquid crystal molecules are moved in two directions of a smectic layer direction 102 (or 102a) and a smectic layer normal direction 103 (or 103a) with respect to a smectic layer structure 101 as shown in FIG. 10. The cell thickness increase caused by the movement in the smectic layer direction tends to be dissolved if the cell is left standing to some extent after the drive is terminated, but the cell thickness increase in the smectic layer normal direction is not remarkably dissolved.

In the present invention, in order to suppress the above-mentioned liquid crystal molecular movement, the substrate surface is provided with an unevenness (convexities or concavities).

More specifically, in the ferroelectric liquid crystal device of the present invention, (A) a difference in liquid crystal layer thickness is formed between a part sandwiched by an opposite pair display electrodes and a part sandwiched by a display electrode on one substrate and a part between neighboring display electrodes on the other substrate, and the difference is at least ½ of the liquid crystal layer thickness at the part sandwiched by the opposite pair of display electrodes; or (B) a groove having minute convexities with a maximum diameter of at least 0.1 μm is formed between neighboring electrodes on a substrate, and the neighboring electrodes extend in a direction which forms an angle of 45–135 degrees with a normal to smectic layers of the liquid crystal.

By forming a difference in liquid crystal layer thickness in the above-described manner, it is possible to remove a continuity of the kink in the chevron structure so that the oscillation of liquid crystal molecules due to perturbation during a drive, which is most noticeable at the kink, is not readily propagated or transferred in the liquid crystal layer, thus suppressing the above-mentioned liquid crystal movement.

Such a difference in liquid crystal layer thickness may be formed by digging surface parts of a substrate between pixels, e.g., by etching, or by forming barrier walls of, e.g., a heat-resistant photoresist, at parts between pixels.

Further, it is possible to remove the above-mentioned liquid crystal movement by forming a groove having minute convexities with a maximum diameter of at least 0.1 μm between neighboring electrodes on a substrate so that the neighboring electrodes extend in a direction forming an angle of 45–135 degrees with a normal to smectic layers of the liquid crystal. It is further preferred that the convexities have an average diameter of at least 0.1 μm. In view of stable alignment of the liquid crystal, it is preferred that the convexities have an average diameter of at most 3 μm, more preferably at most 2 μm.

The spacing between electrodes, i.e. the width of non-pixel parts may preferably have a width which is at most 20 μm, more preferably at most 10 μm, and at least 3 μm, more preferably at least 5 μm, so as to avoid a disorder in liquid crystal alignment at pixels while suppressing the liquid crystal movement. However, this does not mean that the effect of the invention cannot be attained outside the above range.

The liquid crystal layer thickness may preferably be 0.5–8 μm, more preferably 1–5 μm. Taking this into account, the display electrodes may preferably have a thickness of 300–5000 Å, more preferably 1000–3000 Å.

Hereinbelow, some embodiments of the liquid crystal device according to the present invention will be described with reference to the drawings.

EXAMPLE 1

Figure 5A:
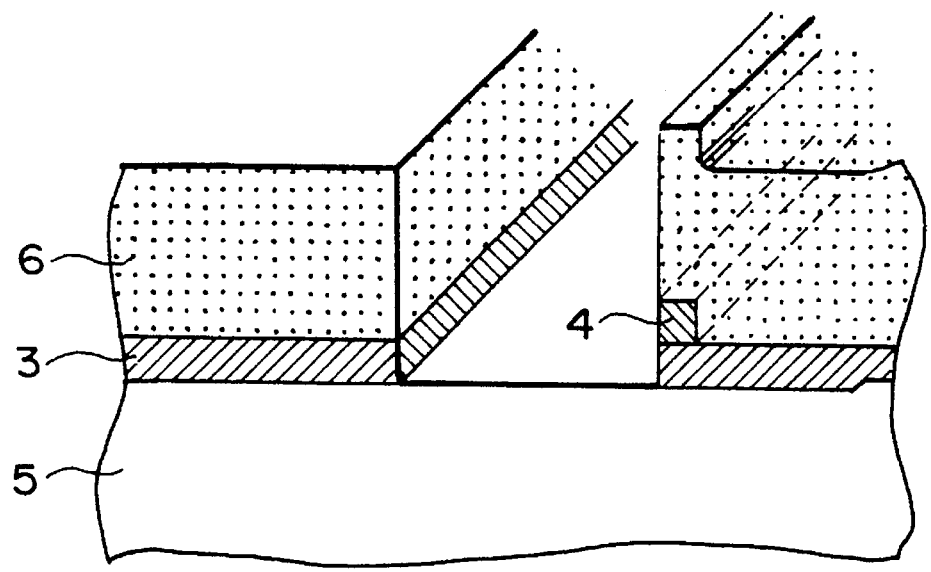
FIG. 5A is a schematic partial perspective view for illustrating a process for production of a liquid crystal cell according to Example 1.
Figure 5B:
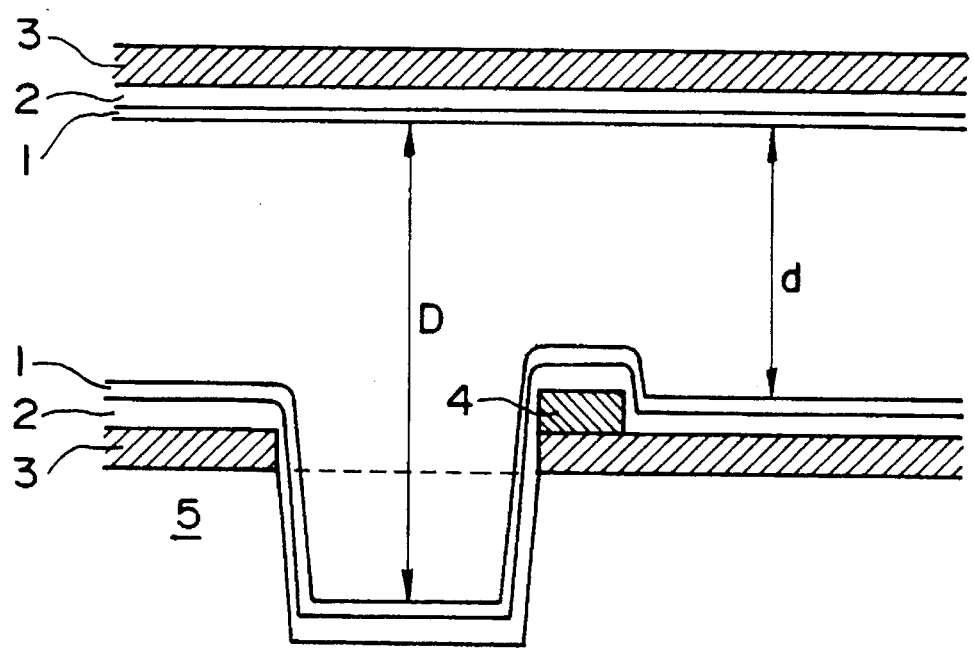
FIGS. 5B and 5C are respectively a schematic partial sectional view of a liquid crystal cell according to Example 1.
Figure 5C:
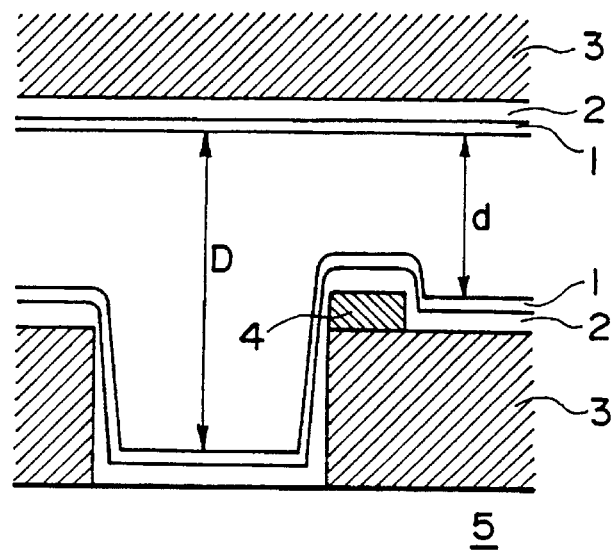
Figure 6:
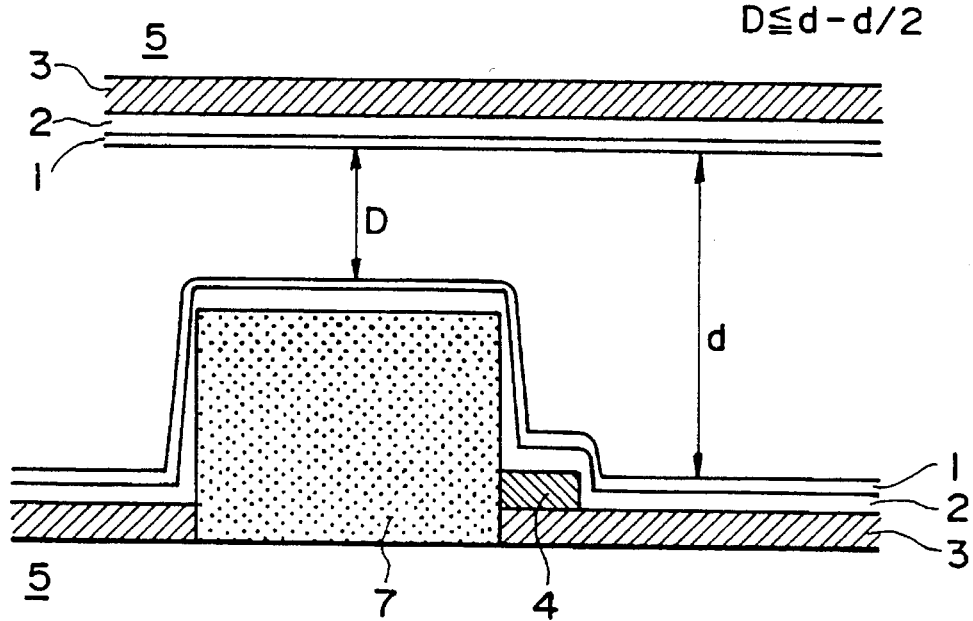
FIG. 6 is a schematic sectional view of a liquid crystal cell according to Example 2.

FIGS. 5B and 5C respectively illustrate a sectional view of an embodiment of the liquid crystal device according to the present invention, and FIG. 6 (perspective view) illustrates in intermediate state during the preparation of the device.

The respective devices (cells) shown in FIGS. 5 and 6 include a pair of glass substrates 5 each having thereon transparent electrode 3, metal electrodes 4 each formed along a side of a transparent electrode 3, an insulating film 2 covering the transparent electrodes 3 and the metal electrodes 4, and an alignment film 1 disposed on the insulating film 2.

For preparation of the device shown in FIG. 5B, a glass substrate 5 is first provided with transparent electrodes 3 and metal electrodes 4 in respectively prescribed sizes and is then further covered with a photoresist 6 except for the parts between the electrodes 3 (i.e., between the pixels) as shown in FIG. 5A. Then, the exposed parts between the electrodes of the glass substrate are etched by an etchant liquid having a composition as shown Table 1 below (for any of chemical abrasion, non-glare finish and frost finish) so as to form a groove giving a liquid crystal layer thickness D thereat which is larger than a liquid crystal layer thickness d given at the parts sandwiched between the electrodes 3 by a difference of at least ½ times d. Then, the photoresist 6 is removed and the electrodes are coated with an insulating film 2 and an alignment film 1 as shown in FIG. 5B.

In a specific example, the transparent electrodes 3 were formed in a thickness of 1500 Å and the liquid crystal layer thickness (d) at the parts sandwiched between the opposite electrodes was set to be 1.2 μm, so that the glass substrate was required to be etched in a depth of at least 0.45 μm (e.g., 2 μm) and the etching time was about 30 sec. by using the etchant composition for chemical abrasion.

On the other hand, in the case where the cell gap (d) is 1.2 μm, no etching is required at a space between the electrodes (or pixels) if the ITO (transparent) electrode 3 has a thickness of 6000 Å or larger as shown in FIG. 5C.

That is, in both cases of FIGS. 5B and 5C, the relationship of D≧d+d/2 is satisfied.

TABLE 1

| For | Etchant Composition | | |
|---|---|---|---|
| | Chemical abrasion (%) | Non-glare finish (%) | Frost finish (%) |
| HF | ca. 10 | ca. 15 | |
| NH₄F | ca. 20–30 | ca. 2–4 | ca. 40–50 |
| H₂O | ca. 50–60 | ca. 20–30 | ca. 20–30 |
| weak acid | — | — | ca. 20–30 |
| Additive* | ca. 10 | ca. 50 | |

*For adjusting viscosity and suppressing dissolution of reaction products.

EXAMPLE 2

Another embodiment is described with reference to FIG. 6 wherein like parts are denoted by like reference numerals as in FIG. 5 and a pattern of a heat-resistant photoresist 7 is formed.

In the embodiment shown in FIG. 6, transparent electrodes (ITO) 3 and metal electrodes 4 are formed in similar sizes as in Example 1, then a heat-resistant photoresist layer 7 is formed as a coating and left in the form of stripes only at parts between adjacent electrodes (pixels). Then, the substrate is coated successively with an insulating layer 2 and an alignment film 1.

In a specific example, the liquid crystal layer thickness (d) at the parts sandwiched between the opposite electrodes was set to 1.2 μm and the transparent electrode (ITO) 3 was formed in a thickness of 0.15 μm, so that the photoresist layer was formed in a thickness of at least 0.75 μm with a heat-resistant photoresist ("Lisocoat 10000C", available from Ube Kosan K.K.).

As it was physically impossible to form the photoresist stripes 7 on both substrates, they were actually formed on a substrate having a direction of extension of spaces between adjacent electrodes (pixels) which was effective to suppress the liquid crystal movement.

The above cell preparation was repeated by changing the degree of stepwise difference (Δd=d−D) between the liquid crystal layer thickness at pixels (d) and the liquid crystal layer thickness at parts between pixels (D). The resultant cells (panels having a diagonal size of inch and a containing a mixture liquid crystal including a phenylpyrimidine as a principal component and a fluorine-containing chiral component) was subjected to a driving test including application of 20 V rectangular pulses at 30° C. to measure an MTBF (mean-time between failure) until the cell caused a remarkable deterioration in display state or cell damage due to occurrence of voids not removable by a realizing treatment because of liquid crystal molecular movement in the direction normal to the liquid crystal molecular layers. The results are shown in the following Table 2.

TABLE 2

| Δd = (d-D) | MTBF (hours) |
|---|---|
| ⅛ d | 1300 |
| ¼ d | 2000 |
| ⅓ d | 5000 |
| ≧½ d | >10000 |

As described above, if the stepwise difference Δd was ½ or more of the liquid crystal layer thickness at pixels (d), it was possible to ensure a reliability in terms of MTBF of at least 10000 hours.

EXAMPLES 3–5

Another embodiment is described with reference to FIGS. 7–10.

Figure 7:
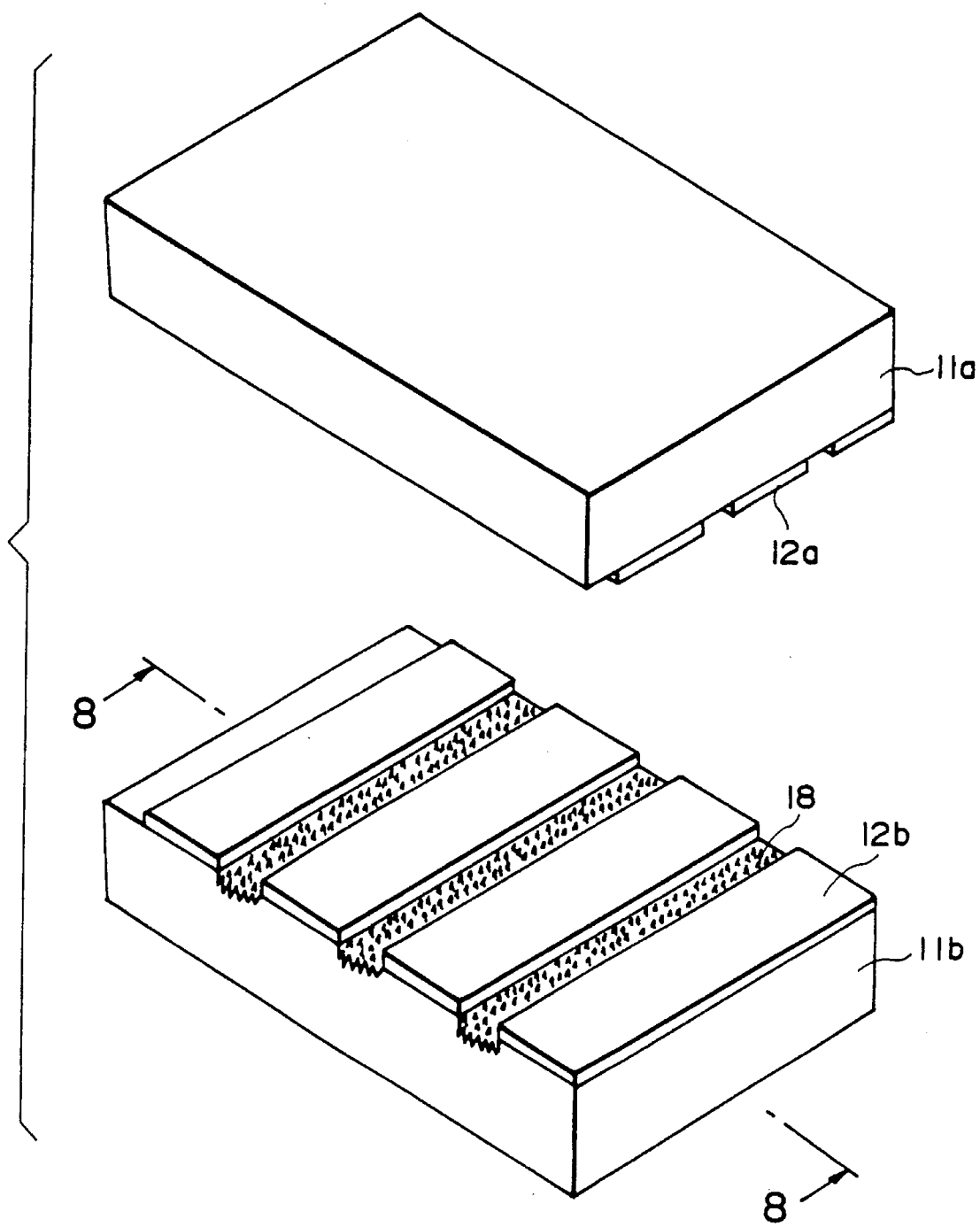
FIG. 7 is a schematic perspective view of a liquid crystal cell according to another embodiment of the invention.
Figure 8:
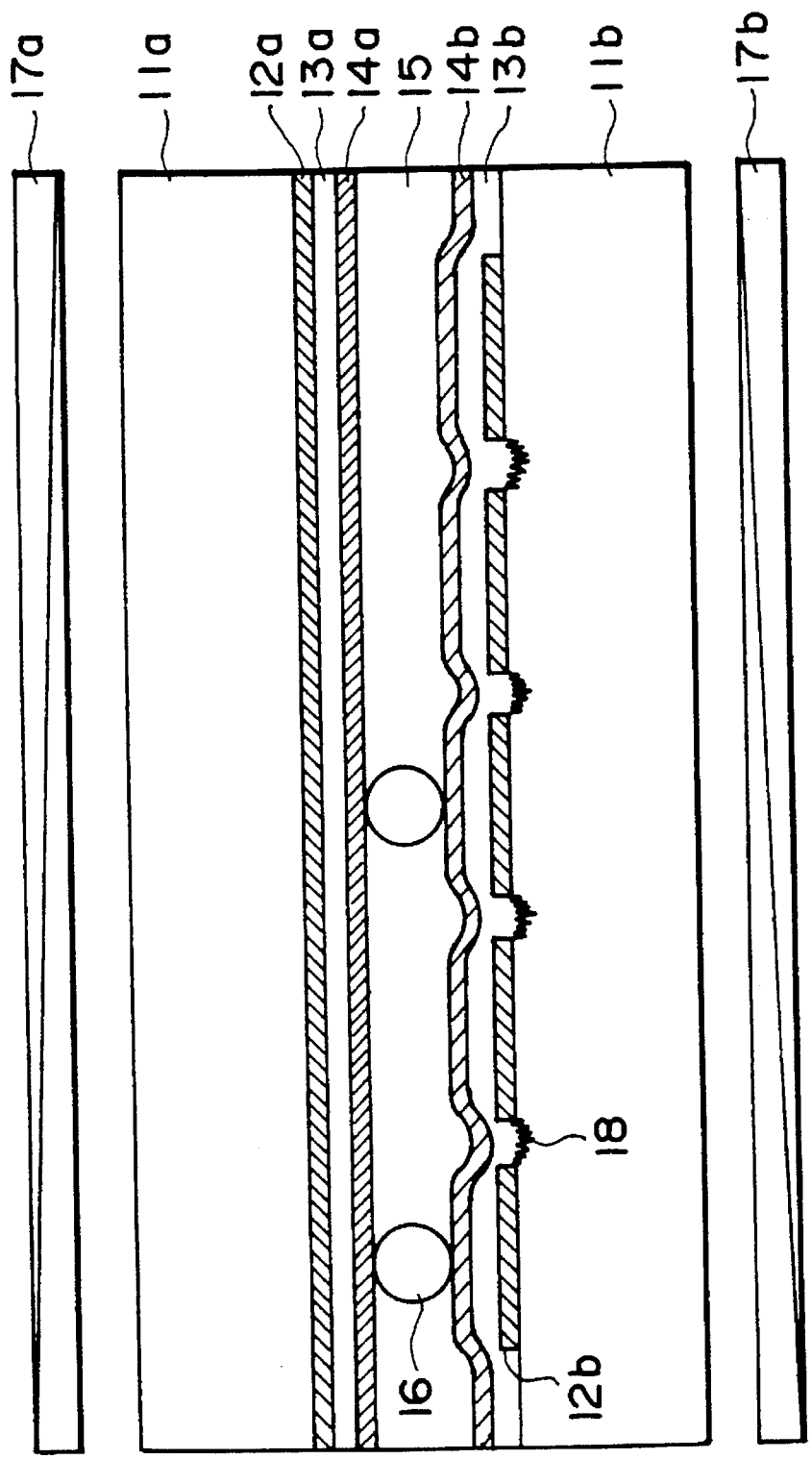
FIG. 8 is a sectional view taken along the line 8—8 in FIG. 7.
Figure 9:
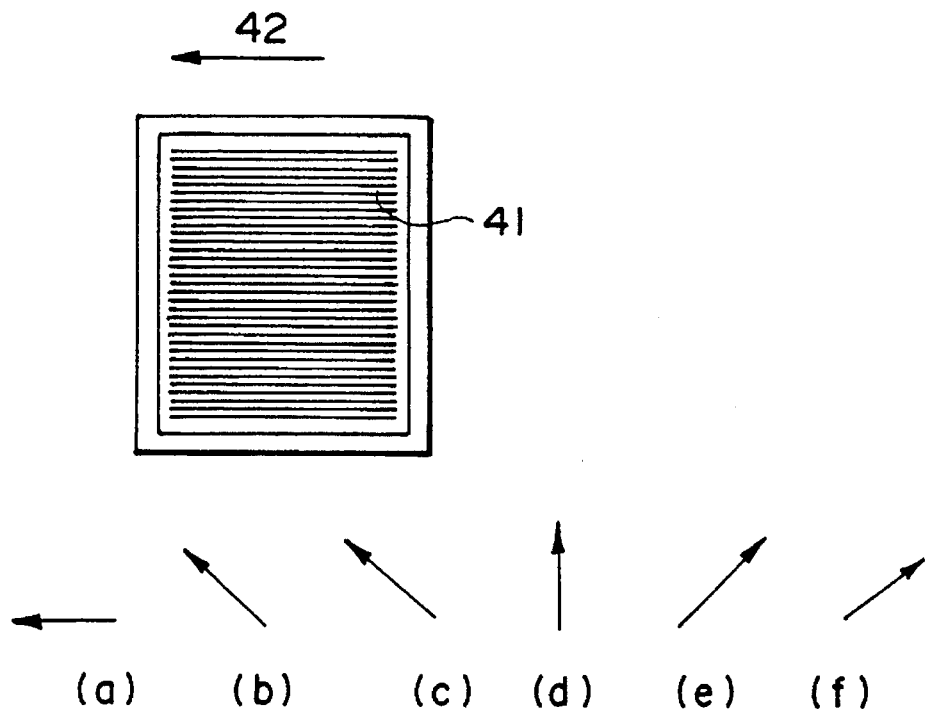
FIG. 9 is an explanatory view for illustrating a relationship between a layer normal direction of smectic layers in a cell and a direction of extension of electrodes on a substrate having a minute unevenness between the electrodes.

FIG. 7 is a schematic perspective view of a liquid crystal cell according to an embodiment of the present invention and FIG. 8 is a sectional view taken along a line 8—8 in FIG. 7. At best shown in FIG. 8, the liquid crystal cell comprises a pair of an upper substrate 11a and a lower substrate 11b disposed in parallel with each other and respectively having thereon about 400 to 2000 Å-thick transparent electrodes 12a and 12b, insulating films 13a and 13b, and alignment control films 14a and 14b. Between the alignment control films 14a and 14b is disposed a ferroelectric smectic liquid crystal 15 preferably in a non-helical structure providing at least two stable states. The alignment control films 14a and 14b are provided with an aligning treatment for aligning the smectic liquid crystal 15. By the aligning treatment, it is possible to control the direction of extension of smectic layers of the liquid crystal 15. The insulating films 13a and 13b may comprise a film of, e.g., SiO₂, TiO₂ or Ta₂O₅, having a thickness of, e.g., 200–3000 Å but can be omitted. The spacing between the substrates is held by, e.g., silica beads 16 of, e.g., about 1.5 μm (generally 0.1–3.5 μm) in diameter. The entire cell structure is sandwiched between polarizers 17a and 17b.

In this embodiment, surface parts 18 of one substrate 11b between pixels (or electrodes) are provided with minute convexities with a maximum (preferably, average) diameter or grain size of at least 0.1 μm. Such convexities between pixels of a substrate are formed in a process of forming patterned transparent electrodes in the following manner. First of all, the substrate 11b is laminated with a transparent electrode layer and a photoresist layer, and the photoresist layer is exposed to be left in a pattern of the transparent electrodes 12b. Then, the exposed parts of the transparent electrode layer are etched with an etchant liquid to form the transparent electrodes 12b in a pattern. Then, before peeling the photoresist, the exposed parts of the substrate 11b between pixels are etched with an etchant mixture comprising NH₄F, H₂O and a weak acid to form thereat convexities with a maximum diameter of at least 0.1 μm. A preferred example of the etchant mixture is one in the form of a paste suitable for screen printing (e.g., "DECA GLASSETCH", available from DECA PRODUCTS CO., Belgium). The size of the convexities formed between pixels can be controlled by the ratio among the ingredients, such as NH₄F, H₂O and the weak acid, and the etching time. After the etching, the substrate is sufficiently washed with water, and the photoresist is peeled.

An specific examples, 6 liquid crystal cells each including one substrate having minute convexities formed in the above described manner were prepared. When each substrate was observed with respect to the parts between pixels by a scanning electron microscope, whereby convexities with a maximum diameter of 1 μm were confirmed. The 6 cells were respectively subjected to aligning treatments so that the resultant directions of normal to smectic layers form intersection angles θ of (a) 0 degree, (b) 40 degrees, (c) 45 degrees, (d) 90 degrees, (e) 135 degrees and (f) 140 degrees, as shown at (a)–(f) of FIG. 9 with respect to the extension direction 42 of electrodes on the substrates or the extension of the parts 41 between pixels provided with minute convexities. These cells were respectively identified as Comparative Examples 1–2, Examples 3–5 and Comparative Example 3.

Then, the respective cells (panels having a diagonal size of 15 inch) were filled with a pyrimidine-based mixture liquid crystal showing the following phase transition series:

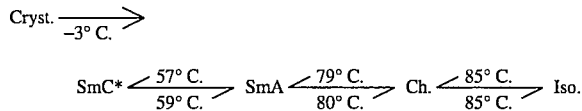

Then, the liquid crystal in each cell was entirely oriented to one optically stable state and then subjected to a drive cycle including about 16 hours of drive by application of rectangular pulses having a pulse duration of 25 μsec, a voltage amplitude of 40 volts and a duty ratio of ½ and about 8 hours of standing without applying the pulses. The above drive cycle was repeated 7 times for each cell, and then the cell thickness was measured along the peripheral sides to determine a maximum cell thickness. The results are shown in the following Table 3.

TABLE 3

|  | Comp. Ex. 1 | Comp. Ex. 2 | Ex. 3 | Ex. 4 | Ex. 5 | Comp. Ex. 3 |
| --- | --- | --- | --- | --- | --- | --- |
| Itersection angle θ (deg.) | 0 | 40 | 45 | 90 | 135 | 140 |
| Maximum cell thickness increase (%) | +35 | +17 | +5 | +1 | +7 | +18 |

Then, the respective cells after the drive test were sandwiched between cross nicol polarizers to inspect the coloring with naked eyes. As a result, no region of cell thickness increase was observed with respect to the cells of Examples 3–5 having an intersection angle θ in the range of 45–135 degrees, but the other cells of Comparative Examples 1–3 showed a yellow region corresponding to the cell thickness increase. Further, each cell was observed through a polarizing microscope to observe the liquid crystal alignment at the parts between pixels provided with minute convexities, whereby the alignment was not that of SmC* but one not showing a clear extinction position.

EXAMPLE 6, COMPARATIVE EXAMPLE 4

Two liquid crystal cells were prepared in the same manner as in Example 4, i.e., so as to provide an intersection angle θ of 90 degrees, except that the etching for providing minute convexities was moderated by decreasing the $NH_4F$ content in the etchant mixture and shortening the etching time. As a result, the thus prepared two cells were formed to include one substrate each having minute convexities showing a maximum diameter of 0.1 μm (Example 6) and 0.06 μm (Comparative Example 4), respectively.

Then, each cell was subjected to 7 cycles of driving-standing test in the same manner as described above with respect to, e.g., Example 4. As a result, the cell of Comparative Example 4 showed a maximum cell thickness increase of +25%, whereas the cell of Example 6 showed a maximum cell thickness increase of only +4%.

As described above, it has been found possible to minimize the irreversible liquid crystal movement during a continual drive for a long period in the direction normal to smectic layers by roughening the substrate surface parts between pixels of a substrate which has a direction of extension of the parts between pixels or extension of electrodes closer to normal to the normal to smectic layers than the other substrate so as to hinder a continuous alignment of liquid crystal in the direction normal to smectic layers.

As described above, according to the present invention, it has become possible to minimize the liquid crystal movement even in a long period of continual drive, thus minimizing or substantially removing the yellowing of a display panel and the local cell thickness increase due to the liquid crystal movement.

Incidentally, in the present invention, it is possible to combine the formation of convexities at parts between pixels of a substrate and the formation of a stepwise difference in liquid crystal layer thickness between a part sandwiched between opposite electrodes (i.e., a pixel part) and a part between adjacent electrodes (i.e., a part between pixels). By the combination, it becomes possible to further minimize the liquid crystal movement.

What is claimed is:

1. A ferroelectric liquid crystal device, comprising: a pair of substrates each having thereon a group of stripe-shaped electrodes, and a ferroelectric liquid crystal disposed between the substrates, wherein a groove having minute convexities is formed between neighboring stripe-shaped electrodes on a substrate, and the neighboring stripe-shaped electrodes on the substrate extend in a direction which forms an angle of 45–135 degrees with a normal to smectic layers of the liquid crystal.

2. A device according to claim 1, wherein said stripe-shaped electrodes are formed on an insulating substrate.

3. A device according to claim 2, wherein said insulating substrate comprises a glass substrate.

4. A device according to claim 1, wherein said convexities have an average diameter of at least 0.1 μm.

5. A device according to claim 1, wherein said convexities have a diameter of at most 3 μm.

6. A device according to claim 1, wherein the groove having minute convexities has a width of at most 20 μm.

7. A device according to claim 1, wherein said stripe-shaped electrodes are formed in a thickness of 300–5000 Å.

8. A device according to claim 1, wherein said stripe-shaped electrodes are covered with an alignment film.

* * * * *